United States Patent
Mihlbauer et al.

(10) Patent No.: US 7,909,371 B1
(45) Date of Patent: Mar. 22, 2011

(54) VIVARIUM COVER LOCKING CLIP

(75) Inventors: Brad L. Mihlbauer, Mukwonago, WI (US); David R. Troop, II, Burbank, CA (US)

(73) Assignee: Central Garden and Pet Company, Walnut Creek, CA (US)

(*) Notice: Subject to any disclaimer, the term of this patent is extended or adjusted under 35 U.S.C. 154(b) by 894 days.

(21) Appl. No.: 11/759,275

(22) Filed: Jun. 7, 2007

(51) Int. Cl.
*E05C 19/06* (2006.01)
*E05C 19/18* (2006.01)

(52) U.S. Cl. ............ 292/80; 292/84; 292/87; 292/288; 292/DIG. 11

(58) Field of Classification Search ............ 292/80, 292/84, 85, 87, 89, 288, 289, 292, 295, 296, 292/DIG. 11
See application file for complete search history.

(56) References Cited

U.S. PATENT DOCUMENTS

| | | | |
|---|---|---|---|
| 281,268 A * | 7/1883 | Haskell | 190/105 |
| 2,830,843 A * | 4/1958 | Seaburg et al. | 49/449 |
| 3,240,523 A * | 3/1966 | Heimann | 292/198 |
| 3,938,839 A * | 2/1976 | Collier | 292/258 |
| 4,080,811 A * | 3/1978 | Nielsen, Jr. | 70/164 |
| 4,130,309 A * | 12/1978 | Lewis | 292/258 |
| 4,270,668 A * | 6/1981 | Berfield | 220/324 |
| 4,991,888 A * | 2/1991 | Cinnamond | 292/296 |
| 5,172,454 A * | 12/1992 | Martignago | 24/68 SK |
| 5,328,049 A | 7/1994 | Ritzow | |
| 5,363,801 A | 11/1994 | Watters et al. | |
| 5,571,272 A * | 11/1996 | Roehr et al. | 292/80 |
| 5,762,026 A | 6/1998 | Watters | |
| 5,832,871 A | 11/1998 | Leis | |
| 6,604,764 B2 * | 8/2003 | Zemzik | 292/293 |
| 6,763,691 B1 * | 7/2004 | Rafferty | 70/164 |
| 6,931,893 B2 * | 8/2005 | Agbay | 70/2 |
| 7,025,221 B2 * | 4/2006 | Kim | 220/324 |
| 7,048,464 B2 * | 5/2006 | Ronnquist | 403/321 |
| 7,370,891 B1 * | 5/2008 | Schmitt et al. | 292/113 |

FOREIGN PATENT DOCUMENTS

GB       2226545 A   *   7/1990

* cited by examiner

*Primary Examiner* — Carlos Lugo
(74) *Attorney, Agent, or Firm* — Andrus, Sceales, Starke & Sawall, LLP

(57) ABSTRACT

A vivarium cover locking clip prevents removal of a cover from a vivarium tank. The clip includes first and second brackets matingly engaging each other in a detent locked position and respectively engaging the cover and the tank and preventing separation thereof. The brackets have a released position permitting separation of the cover and the tank.

19 Claims, 6 Drawing Sheets

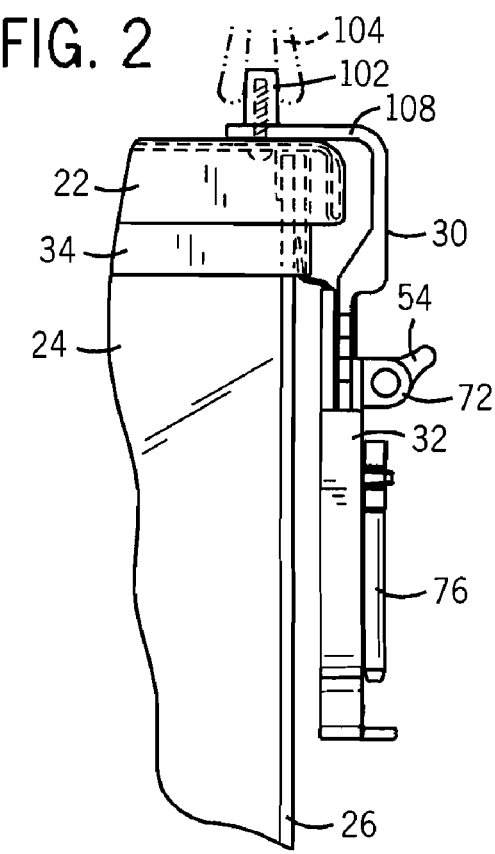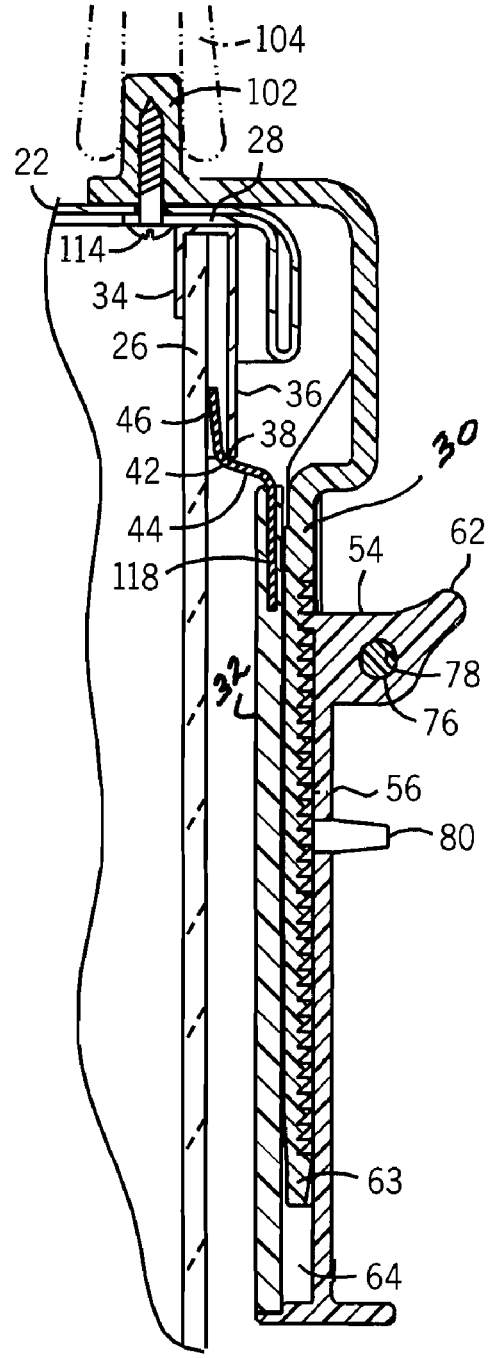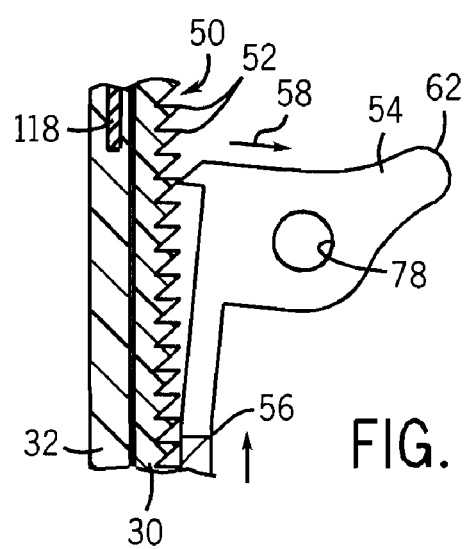

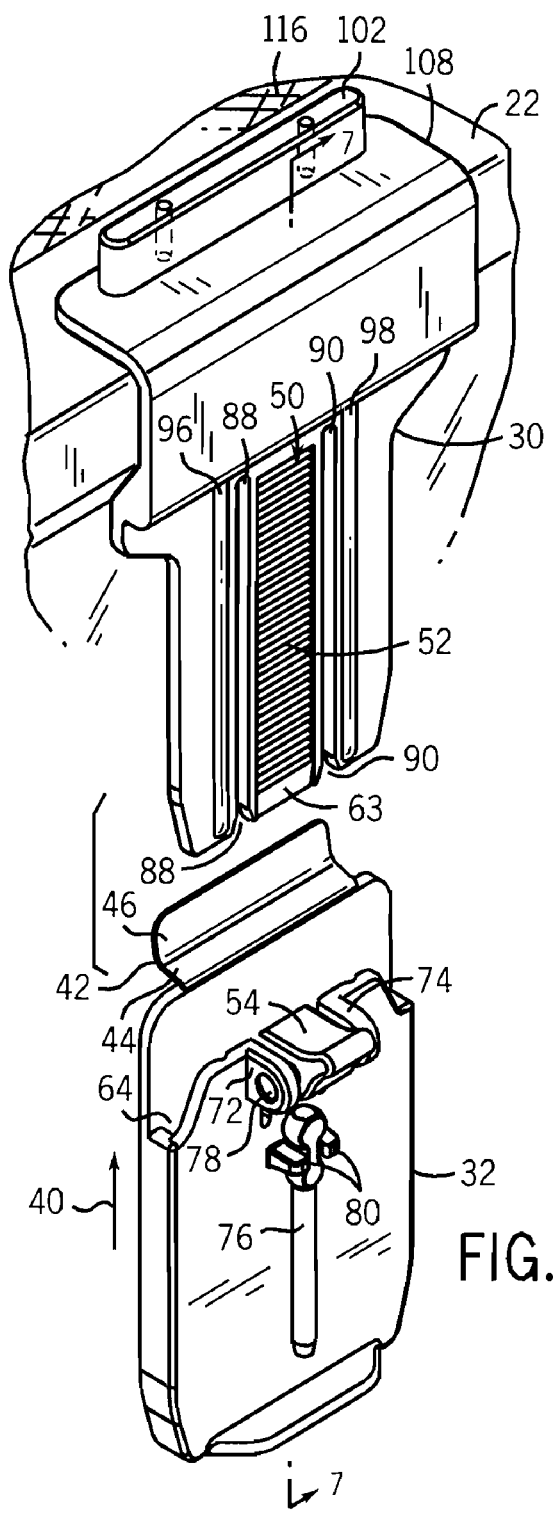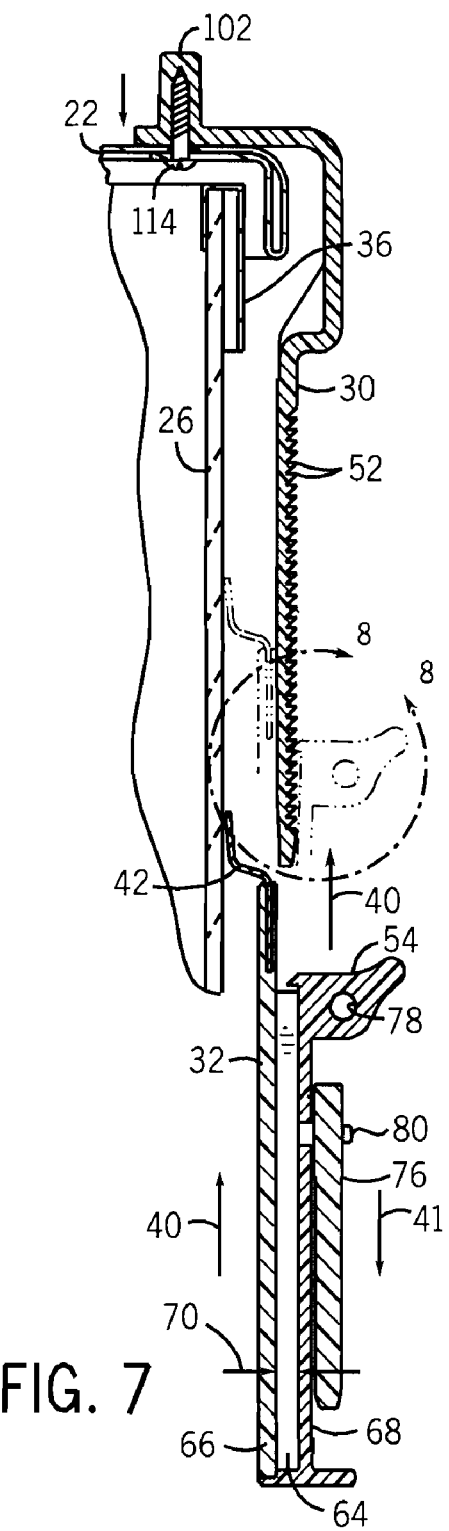

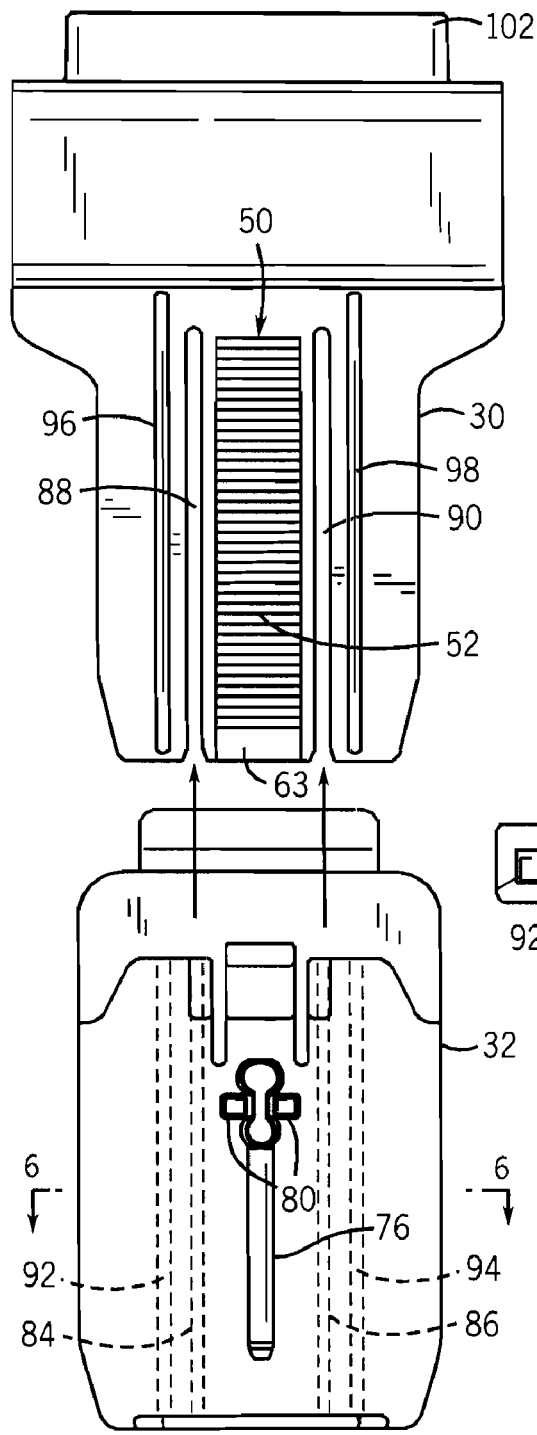
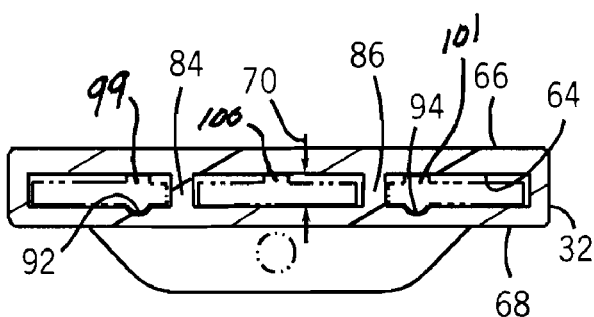

VIVARIUM COVER LOCKING CLIP

BACKGROUND AND SUMMARY

The invention relates to vivariums, including aquariums and terrariums for raising and observing animals or plants, and more particularly to a locking clip for a vivarium cover.

Vivariums, including aquariums and terrariums, typically include a plurality of sidewalls extending upwardly to an open top closed by a cover. The present invention arose during continuing development efforts directed toward simplified secure retention structure preventing removal of the cover.

BRIEF DESCRIPTION OF THE DRAWINGS

FIG. 2 is a side elevation view of the structure of FIG. 1.

FIG. 3 is a sectional view taken along line 3-3 of FIG. 1.

FIG. 4 is an exploded perspective view of a portion of FIG. 1.

FIG. 5 is a front elevation view of components of FIG. 4.

FIG. 6 is a sectional view taken along line 6-6 of FIG. 5.

FIG. 7 is a sectional view taken along line 7-7 of FIG. 4.

FIG. 8 is an enlarged view taken along line 8-8 of FIG. 7.

DETAILED DESCRIPTION

Figure 1:
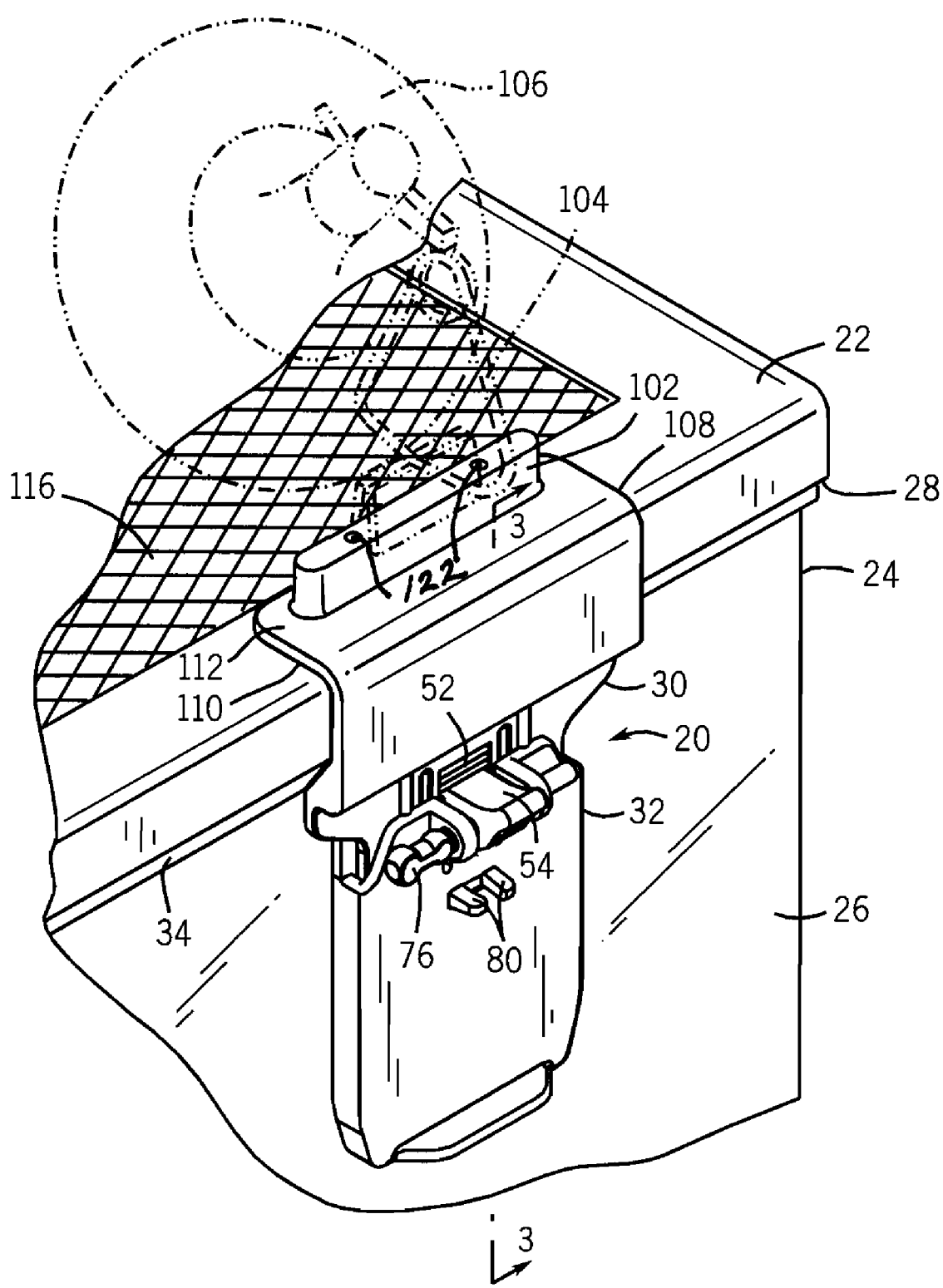
FIG. 1 is a perspective view of a portion of a vivarium tank having a cover secured and retained by a locking clip in accordance with the invention.

FIG. 1 shows a vivarium cover locking clip 20 for preventing removal of a cover 22 from a vivarium tank 24 having a plurality of sidewalls 26 extending axially upwardly to an open top 28 closed by cover 22, FIGS. 2-4. Clip 20 is provided by first and second brackets 30 and 32, FIGS. 4, 5, 7, matingly engaging each other in a detent locked position, FIG. 3, and respectively engaging cover 22 and tank 24 and preventing separation thereof, to be described. Brackets 30 and 32 have a released position, FIG. 8, permitting separation of cover 22 and tank 24. Bracket 30 is fixed to cover 22 and remains attached to the cover upon removal of the cover from the tank. Bracket 32 moves into interference fit against tank 24 at rim 34 upon mating engagement of brackets 30 and 32 in the noted detent locked position. Bracket 32 moves out of the noted interference fit upon release of brackets 30 and 32 to the noted released position. Tank 24 has an upper rim 34 at open top 28. At least a portion 36 of the rim, FIG. 3, is laterally spaced from tank sidewall 26 and has a stop surface 38. Bracket 32, upon upward axial movement as shown at arrow 40, FIGS. 4, 7, moves into interference fit against stop surface 38 of rim 34 upon mating engagement of brackets 30 and 32 in the noted detent locked position. Bracket 32, upon downward axial movement as shown at arrow 41, moves out of the noted interference fit upon release of brackets 30 and 32 to the noted released position. Bracket 32 has an upper L-shaped portion 42 including a first leg 44 extending laterally below the rim, and a second leg 46 extending from first leg 44 axially upwardly between the rim at portion 36 and the sidewall 26 of the tank. Stop surface 38 faces at least one of the noted first and second legs.

Bracket 30 includes a rack 50, FIGS. 4, 5, having a plurality of teeth 52, FIGS. 7, 8. Bracket 32 has a catch 54 engaging teeth 52 and providing the detent locking the brackets 30 and 32 in the noted detent locked position. Catch 54 in one embodiment extends as a living hinge at 56 from bracket 32 and is movable as shown at arrow 58, FIG. 8, out of engagement with teeth 52 to release the detent and permit movement of brackets 30 and 32 to the released position and permit separation of cover 22 and tank 24. In other embodiments, catch 54 may be pivotally mounted to bracket 32 or otherwise movably mounted thereto to enable movement of catch 54 out of engagement with teeth 52 of rack 50. Brackets 30 and 32 engage in ratchet relation along rack 50 along an insertion direction 40 permitting movement of brackets 30 and 32 along each other to the noted detent locked position, and a retraction direction 41 opposite to insertion direction 40 and permitting movement of brackets 30 and 32 along each other to the noted released position upon manually moving catch 54 out of engagement with teeth 52, for example as shown at 58, FIG. 8. The user engages catch 54 at thumb or finger engagement portion 62 to provide the noted releasing movement at 58. Brackets 30 and 32 engage each other in rectilinear sliding relation. The brackets engage each other in axial sliding relation parallel to the respective axially upwardly extending sidewall 26 of the tank. Catch 54 is laterally movable into and out of engagement with teeth 52.

Brackets 30 and 32 engage in tongue-and-groove relation. Bracket 30 includes a tongue 63 at rack 50 having the noted plurality of teeth 52 and is insertable into and retractable out of a pocket 64, FIGS. 4, 7, formed in bracket 32. Pocket 64 has a proximal wall 66 extending axially along and adjacent to sidewall 26 of the tank. Pocket 64 has a distal wall 68 on the opposite side of proximal wall 66 from sidewall 26 and laterally spaced from proximal wall 66 by a lateral gap 70 between proximal wall 66 and distal wall 68. Tongue 63 is insertable axially downwardly into lateral gap 70, and is retractable axially upwardly out of lateral gap 70. Catch 54 is on distal wall 68 and engages teeth 52 on rack 50 of tongue 63 in pocket 64. Catch 54 is manually movable away from teeth 52 to disengage the teeth, as above noted. A pair of stanchions 72 and 74 are provided on distal wall 68 and are aligned with catch 54 on opposite sides thereof and receive a removable locking pin 76 engaging the stanchions and the catch, preferably by extending through aligned apertures 78, and preventing movement of catch 54 away from teeth 52. Pin 76 is removable from the apertures 78 of the stanchions and the catch, e.g. by removing the pin out of the page in FIGS. 3, 7, which is leftwardly in FIGS. 1, 4, to permit movement of catch 54 away from teeth 52. Pin 76, when not in use, may be conveniently stored on distal wall 68 of bracket 32 at grips 80. Locking pin 76 when inserted into apertures 78 provides an additional positive lock preventing disengagement of catch 54 from teeth 52.

Figure 10:
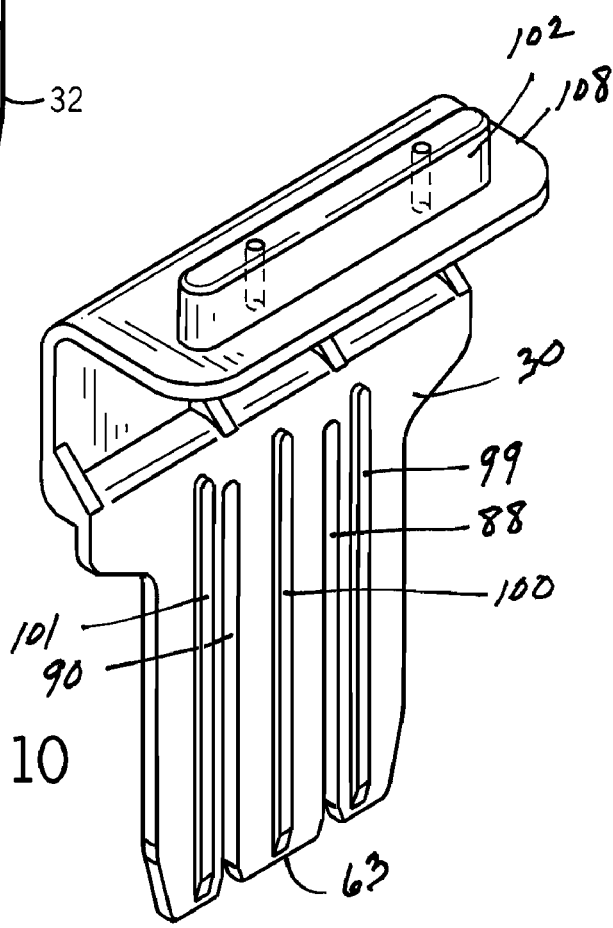
FIG. 10 is a rear perspective view of a component of FIG. 5.

A pair of support ribs 84 and 86 are provided by internal walls which laterally span gap 70 in pocket 64, FIG. 6, and support distal wall 68 relative to proximal wall 66 and fix the lateral dimension of lateral gap 70 and prevent lateral movement of distal wall 68 away from proximal wall 66 to in turn provide a backstop preventing lateral movement of catch 54 away from tongue 63 and rack 50 and teeth 52 which would otherwise defeat the detent locking of brackets 30 and 32. Tongue 63 has a pair of axially extending slots 88 and 90 spaced by rack 50 therebetween. Ribs 84 and 86 are axially aligned with and received in slots 88 and 90, respectively, such that slots 88 and 90 slide axially downwardly along ribs 84 and 86 upon insertion of tongue 63 into pocket 64. Pocket 64 may additionally have a pair of concave recessed tracks 92 and 94 receiving and additionally guiding convex raised rails 96 and 98 on tongue 63 on distally opposite sides of slots 88 and 90. Convex raised rails 96 and 98 are on the frontside of bracket 30 along tongue 63. In the preferred embodiment, the backside of bracket 30, FIG. 10, has a plurality of convex raised rails 99, 100, 101 along tongue 63 and engaging the frontside of proximal wall 66 in pocket 64. It is preferred that the frontside of proximal wall 66 not be provided with concave recessed tracks such as 92, 94, whereby convex raised rails 99, 100, 101 keep bracket 30, particularly along tongue 63, positioned in front of proximal wall 66 of bracket 32 for a more positive fit and lock, i.e. convex raised rails 99, 100, 101 keep bracket 30 at tongue 63 in a pushed forward position such that teeth 52 of rack 50 are pressed forwardly against and engaged by catch 54.

Figure 9:
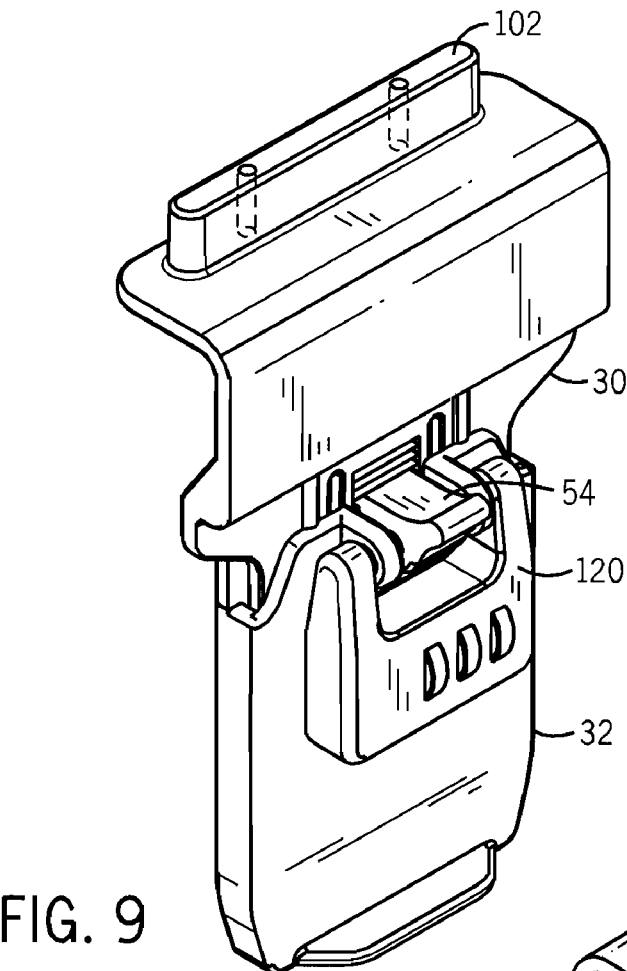
FIG. 9 is a perspective view like a portion of FIG. 1 and shows another embodiment.
Figure 11:
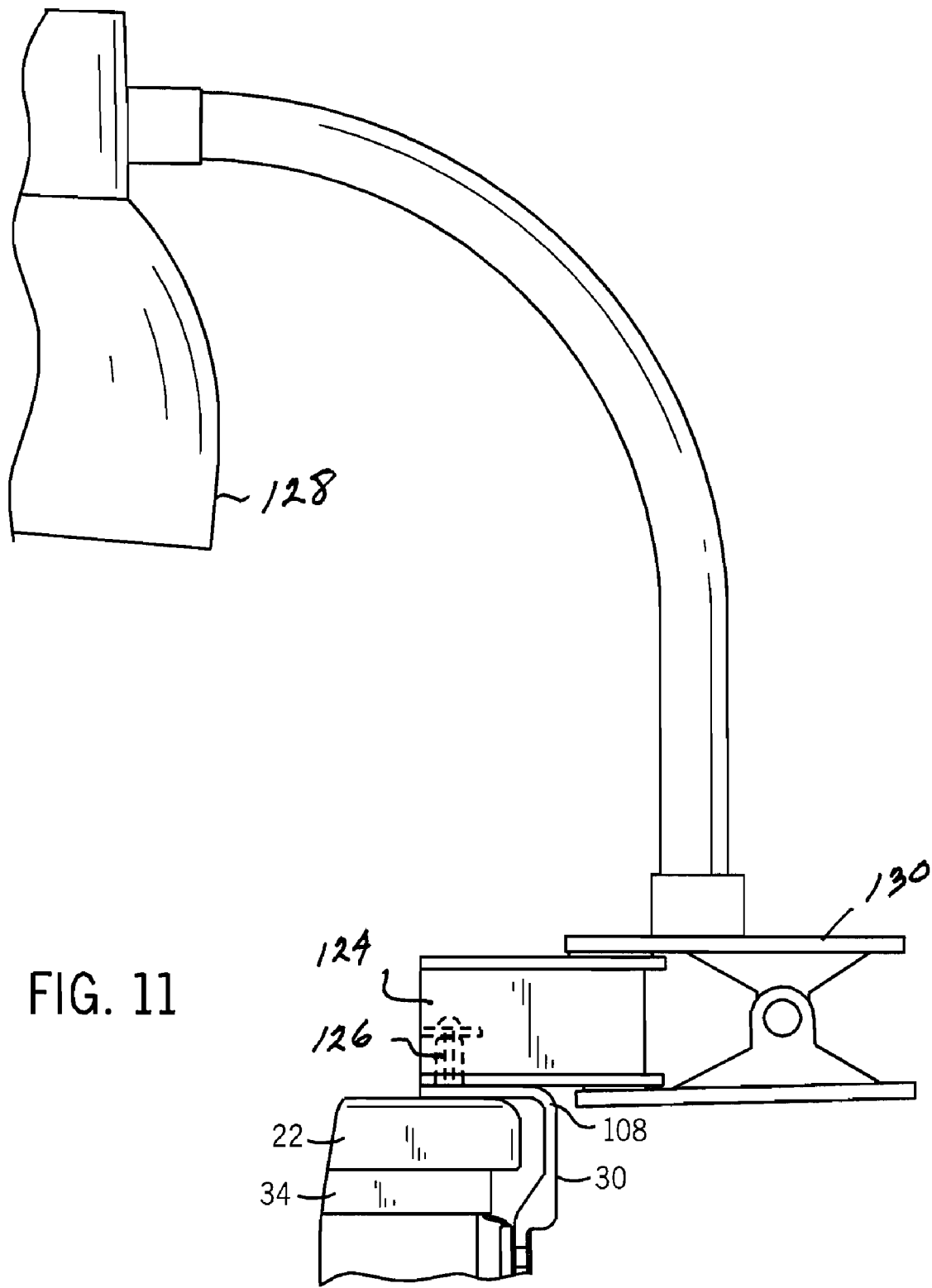
FIG. 11 is a side view like a portion of FIG. 1 and shows an alternate embodiment.

Bracket 30 is fixed to cover 22 and has an elongated anchor boss 102 protruding upwardly therefrom and providing an accessory attachment anchor, e.g. for a clamp 104 of a lamp 106. Bracket 30 has an attachment section 108 having an undersurface 110 engaging cover 22 therebelow, and an upper surface 112 from which anchor boss 102 extends axially upwardly. A pair of attachment screws such as 114, FIG. 3, preferably self-tapping, extend axially into each of cover 22, attachment section 108 of bracket 30, and anchor boss 102. The vivarium tank is typically glass or plexiglass, and has a metal or plastic rim 34. Cover 22 is typically metal or plastic, and may have a metal or plastic screen or grate 116. Brackets 30, 32 are preferably plastic, and it is preferred that L-shaped portion 42 be metal and have a lower anchoring segment 118 in-molded to bracket 32. Pin 76 may be metal or plastic. In an alternative, a padlock or combination lock 120, FIG. 9, may be used for insertion through apertures 78, for yet greater security. In a desirable aspect, the locking clip provided by brackets 30, 32 provides a universal fit, i.e. one size fits all. The top surface of anchor boss 102 has a pair of holes or bores 122 therein for receiving future attachments, for example an auxiliary mounting block 124, FIG. 11, fit over or otherwise having a lower cavity receiving anchor boss 102 and mounted thereto by screws such as 126 threaded into respective holes 122. A lamp 128 is mounted at side clamp 130 to auxiliary mounting block 124.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A vivarium cover locking clip for preventing removal of a cover from a vivarium tank having at least one sidewall extending axially upwardly to an open top closed by said cover, said clip comprising first and second brackets, said first bracket comprising a rack having a plurality of teeth and said second bracket comprising a catch matingly engaging said teeth in sliding relation in a detent locked position and respectively engaging said cover and said tank and preventing separation thereof, said first and second brackets having a released position permitting separation of said cover and said tank, wherein said tank has an upper rim at said open top, at least a portion of said rim being laterally spaced from said sidewall and having a stop surface, said first bracket is fixed to said cover, and said second bracket moves into interference fit against said stop surface of said rim upon mating engagement of said first and second brackets in said detent locked position, and said second bracket moves out of said interference fit upon release of said first and second brackets to said released position.

2. The vivarium cover locking clip according to claim 1 wherein said second bracket has an upper L-shaped portion including a first leg extending laterally below said rim, and a second leg extending from said first leg axially upwardly between said rim and said respective sidewall of said tank.

3. The vivarium cover locking clip according to claim 2 wherein said stop surface faces at least one of said first and second legs.

4. The vivarium cover locking dip according to claim 1 wherein said first and second brackets engage in ratchet relation along said rack along an insertion direction permitting movement of said first and second brackets along each other to said detent locked position, and a retraction direction opposite to said insertion direction and permitting movement of said first and second brackets along each other to said released position upon manually moving said catch out of engagement with said teeth.

5. The vivarium cover locking clip according to claim 1 wherein said first and second brackets engage each other in rectilinear sliding relation.

6. The vivarium cover locking clip according to claim 1 wherein said first and second brackets engage each other in axial sliding relation parallel to a respective said axially upwardly extending sidewall, and said catch is laterally movable into and out of engagement with said teeth.

7. The vivarium cover locking clip according to claim 6 wherein said first and second brackets engage in tongue-and-groove relation, said first bracket comprising a tongue having said plurality of teeth and insertable into and retractable out of a pocket formed in said second bracket, said pocket having a proximal wall extending axially along and adjacent to said respective sidewalk said pocket having a distal wall on the opposite side of said proximal wall from said sidewall and laterally spaced from said proximal wall by a lateral gap between said proximal wall and said distal walk said tongue being insertable axially downwardly into said lateral gap, and retractable axially upwardly out of said lateral gap.

8. The vivarium cover locking clip according to claim 1 wherein said first bracket has an elongated anchor boss protruding therefrom and providing an accessory attachment anchor.

9. The vivarium cover locking clip according to claim 8 wherein said first bracket has an attachment section having an undersurface engaging said cover therebelow, and an uppersurface from which said anchor boss extends axially upwardly.

10. The vivarium cover locking clip according to claim 9 comprising one or more attachment screws extending axially into each of said cover, said attachment section of said first bracket, and said anchor boss.

11. A vivarium cover locking clip for preventing removal of a cover from a vivarium tank having at least one sidewall extending axially upwardly to an open top closed by said cover, said clip comprising first and second brackets matingly engaging each other in sliding relation in a detent locked position and respectively engaging said cover and said tank and preventing separation thereof, said first and second brackets having a released position permitting separation of said cover and said tank, wherein one of said brackets comprises a rack having a plurality of teeth, and the other of said brackets comprises a catch engaging said teeth and providing said detent locking said first and second brackets in said detent locked position, said catch being movable out of engagement with said teeth to release said detent and permit movement of said first and second brackets to said released position and permit separation of said cover and said tank, wherein said first and second brackets engage each other in axial sliding relation parallel to a respective said axially upwardly extending sidewall, and said catch is laterally movable into and out of engagement with said teeth, wherein said first and second brackets engage in tongue-and-groove relation, said first bracket comprising a tongue having said plurality of teeth and insertable into and retractable out of a pocket formed in said second bracket, said pocket having a proximal wall extending axially along and adjacent to said respective sidewall, said pocket having a distal wall on the opposite side of said proximal wall from said sidewall and laterally spaced from said proximal wall by a lateral gap between said proximal wall and said distal wall, said tongue being insertable axially downwardly into said lateral gap, and retractable axially upwardly out of said lateral gap, wherein said catch is on said distal wall and engages said teeth on said tongue in said pocket, said catch being manually movable away from said teeth to disengage said teeth.

12. The vivarium cover locking clip according to claim 11 comprising one or more stanchions on said distal wall and aligned with said catch and receiving a removable locking pin engaging said one or more stanchions and said catch and preventing said movement of said catch away from said teeth, said pin being removable from said one or more stanchions to permit said movement of said catch away from said teeth.

13. The vivarium cover locking clip according to claim 11 comprising one or more support ribs laterally spanning said lateral gap and supporting said distal wall relative to said proximal wall and fixing the lateral dimension of said lateral gap and preventing lateral movement of said distal wall away from said proximal wall to in turn provide a backstop preventing lateral movement of said catch away from said tongue and said teeth which would otherwise defeat said detent locking of said first and second brackets.

14. The vivarium cover locking clip according to claim 13 comprising a pair of said support ribs laterally spanning said lateral gap, and wherein said tongue has a pair of axially extending slots spaced by said rack therebetween, said ribs being axially aligned with and received in said slots such that said slots slide axially downwardly along said ribs upon insertion of said tongue into said pocket.

15. The vivarium cover locking clip according to claim 14 wherein said tongue has a pair of convex raised rails on a frontside thereof facing said distal wall, and said pocket has a pair of concave recessed tracks along said distal wall and receiving and guiding said convex raised rails.

16. The vivarium cover locking clip according to claim 13 wherein said tongue has one or more convex raised rails on a backside thereof facing said proximal wall and engaging said proximal wall to push said first bracket at said tongue forwardly away from said proximal wall and to push said teeth of said rack into engagement with said catch.

17. A vivarium cover locking clip for preventing removal of a cover from a vivarium tank having a plurality of sidewalls extending axially upwardly to an open top closed by said cover, said clip comprising first and second brackets, said first bracket comprising a rack having a plurality of teeth and said second bracket comprising a catch matingly engaging said teeth in sliding relation in a detent locked position and respectively engaging said cover and said tank and preventing separation thereof, said first and second brackets having a released position permitting separation of said cover and said tank, wherein said tank has an upper rim at said open top, at least a portion of said rim extending laterally from a respective said sidewall and having a stop surface, said first bracket is fixed to said cover, and said second bracket moves into interference fit against said stop surface of said rim upon mating engagement of said first and second brackets in said detent locked position, and said second bracket moves out of said interference fit upon release of said first and second brackets to said released position, wherein one of said brackets comprises a rack having a plurality of teeth, and the other of said brackets comprises a catch engaging said teeth and providing said detent locking said first and second brackets in said detent locked position, said catch being movable out of engagement with said teeth to release said detent and permit movement of said first and second brackets to said released position and permit separation of said cover and said tank.

18. The vivarium cover locking clip according to claim 17 wherein said first and second brackets engage each other in axial sliding relation parallel to a respective said axially upwardly extending sidewall, and said catch is laterally movable into and out of engagement with said teeth, wherein said first and second brackets engage in tongue-and-groove relation, said first bracket comprising a tongue having said plurality of teeth and insertable into and retractable out of a pocket formed in said second bracket, said pocket having a proximal wall extending axially along and adjacent to said respective sidewall, said pocket having a distal wall on the opposite side of said proximal wall from said sidewall and laterally spaced from said proximal wall by a lateral gap between said proximal wall and said distal wall, said tongue being insertable axially downwardly into said lateral gap, and retractable axially upwardly out of said lateral gap, wherein said catch is on said distal wall and engages said teeth on said tongue in said pocket, said catch being manually movable away from said teeth to disengage said teeth, and comprising one or more support ribs laterally spanning said lateral gap and supporting said proximal wall relative to said distal wall and fixing the lateral dimension of said lateral gap and preventing lateral movement of said distal wall away from said proximal wall to in turn provide a backstop preventing lateral movement of said catch away from said tongue and said teeth which would otherwise defeat said detent locking of said first and second brackets.

19. The vivarium cover locking clip according to claim 18 wherein said second bracket has an upper L-shaped portion including a first leg extending laterally below said rim, and a second leg extending from said first leg axially upwardly between said rim and said respective sidewall of said tank, wherein said stop surface faces at least one of said first and second legs, wherein said first and second brackets engage in ratchet relation along said rack along an insertion direction permitting movement of said first and second brackets along each other to said detent locked position, and a retraction direction opposite to said insertion direction and permitting movement of said first and second brackets along each other to said released position upon manually moving said catch out of engagement with said teeth, and comprising one or more stanchions on said distal wall and aligned with said catch and receiving a removable locking pin engaging said one or more stanchions and said catch and preventing said movement of said catch away from said teeth, said pin being removable from said one or more stanchions to permit said movement of said catch away from said teeth.

\* \* \* \* \*